(12) United States Patent
Martin et al.

(10) Patent No.: US 11,693,121 B2
(45) Date of Patent: Jul. 4, 2023

(54) METHOD FOR CHECKING THE INTEGRITY OF A SATELLITE RADIONAVIGATION SIGNAL

(71) Applicant: THALES, Courbevoie (FR)

(72) Inventors: Nicolas Martin, Valence (FR); Daniel Millwood, Valence (FR); Stéphane Rollet, Valence (FR)

(73) Assignee: THALES, Courbevoie (FR)

( * ) Notice: Subject to any disclaimer, the term of this patent is extended or adjusted under 35 U.S.C. 154(b) by 201 days.

(21) Appl. No.: 16/814,870

(22) Filed: Mar. 10, 2020

(65) Prior Publication Data

US 2020/0292711 A1    Sep. 17, 2020

(30) Foreign Application Priority Data

Mar. 14, 2019    (FR) ...................................... 1902597

(51) Int. Cl.
*G01S 19/21* (2010.01)
*H04K 3/00* (2006.01)
(Continued)

(52) U.S. Cl.
CPC ............. *G01S 19/21* (2013.01); *G01S 19/30* (2013.01); *G01S 19/36* (2013.01); *H04K 3/228* (2013.01); *H04K 3/90* (2013.01); *G01S 19/20* (2013.01)

(58) Field of Classification Search
CPC ........ G01S 19/21; G01S 19/215; G01S 19/22; G01S 19/30; H04K 3/90
See application file for complete search history.

(56) References Cited

U.S. PATENT DOCUMENTS 7,127,011 B2 * 10/2006 Rowitch .................. H04K 3/90
375/346
8,018,988 B2 * 9/2011 Monnerat ............... G01S 19/30
375/150
(Continued)

FOREIGN PATENT DOCUMENTS

EP           2908155 A1 *  8/2015  ............... H04K 3/90
EP           3428688 A1 *  1/2019  ............... H04K 3/90
(Continued)

OTHER PUBLICATIONS

Guo, et al. , "Multiple interferences suppression method based on adaptive signal data regrouping for GNSS receivers", IET Radar Sonar Navigation, vol. 12, Issue 6, pp. 641-648, Jun. 1, 2018.

*Primary Examiner* — Gregory C. Issing
(74) *Attorney, Agent, or Firm* — BakerHostetler

(57) ABSTRACT

A method and a function for checking the integrity of the processing of a radionavigation signal emitted by a satellite, the signal being received by a receiver comprising reception means and processing means, the processing means comprising a linear anti-interference filter, the integrity checking method comprising at least a first phase of detection of a risk of false lock-on comprising the following steps: a step of recovery of a nominal theoretical self-correlation function of the received signal not processed by the linear anti-interference filter; a step of determination of a mean theoretical self-correlation function of the signal received and processed by the linear anti-interference filter over a defined integration period; a step of determination of the number of local maxima of the modulus or of the modulus squared of the mean theoretical self-correlation function, a risk of false lock-on being detected if the number of local maxima is greater than or equal to two.

14 Claims, 7 Drawing Sheets

(51) Int. Cl.
*G01S 19/36* (2010.01)
*G01S 19/30* (2010.01)
*G01S 19/20* (2010.01)

(56) References Cited

U.S. PATENT DOCUMENTS

| | | | | |
|---|---|---|---|---|
| 8,655,298 | B2* | 2/2014 | Martin | G01S 19/21 |
| | | | | 455/296 |
| 8,675,713 | B2* | 3/2014 | Martin | G01S 19/30 |
| | | | | 375/150 |
| 9,654,158 | B2* | 5/2017 | Dafesh | H04B 1/719 |
| 2012/0286994 | A1 | 11/2012 | Letestu et al. | |
| 2013/0154880 | A1 | 6/2013 | Dickman et al. | |
| 2017/0227650 | A1* | 8/2017 | Grobert | H04K 3/65 |

FOREIGN PATENT DOCUMENTS

| | | |
|---|---|---|
| FR | 2 892 202 A1 | 4/2007 |
| FR | 2 898 998 A1 | 9/2007 |
| FR | 2 981 168 A1 | 4/2013 |
| FR | 3 017 716 A1 | 8/2015 |

\* cited by examiner

METHOD FOR CHECKING THE INTEGRITY OF A SATELLITE RADIONAVIGATION SIGNAL

CROSS-REFERENCE TO RELATED APPLICATIONS

This application claims priority to foreign French patent application No. FR 1902597, filed on Mar. 14, 2019, the disclosure of which is incorporated by reference in its entirety.

FIELD OF THE INVENTION

The invention relates to the field of systems processing satellite or pseudolite radionavigation signals, and concerns more specifically the GNSS receivers comprising an anti-interference processing function.

The invention relates more specifically to a method and a function for checking the integrity with respect to a risk of false lock-on for a GNSS receiver comprising an anti-interference processing function.

BACKGROUND

Satellite positioning systems (designated GNSS for "Global Navigation Satellite System") implement multiple satellites transmitting radiofrequency signals and a GNSS receiver placed at the position to be located estimating the distances called "pseudo-distances", which separate it from the satellites based on the propagation times of the satellite signals received multiplied by the speed of light in the medium passed through. From the measurements of the pseudo-distances separating the receiver from the visible satellites and from the knowledge of the positions of these satellites, the receiver deduces its precise position in terms of latitude, longitude and altitude in a terrestrial reference frame by a numeric resolution of triangulation type. The more the positions of the satellites are known accurately to the receiver and the more accurate the measurements of the pseudo-distances carried out by the receiver, the more accurate is the location obtained. The positions of the satellites are determined from a network of ground stations independent of the positioning receivers. The positions of the satellites are communicated to the positioning receivers by the satellites themselves by the data modulating the emitted signals.

The pseudo-distances are deduced by the positioning receivers from the apparent delays exhibited by the received signals. These signals are time-stamped on emission by the clocks of the satellites, which are synchronized on the system time, and on reception by the clock of the receiver, potentially exhibiting a skew relative to the system time. The distances deduced from the duly measured propagation times are called pseudo-distances because they are effected by a common error that can be significant, due to the skew of the clock of the receiver, a skew which can be eliminated if the signals from at least four satellites are received.

Since the radiofrequency signals emitted by satellites travelling great distances are emitted with limited strengths, they arrive with very low strengths at the receivers, embedded in a radiofrequency noise due to the physical environment. To facilitate the reception of the signals emitted by the satellites and render them less sensitive to interferences, notably narrowband, the bandwidths of the signals emitted are spread by means of the spread band technique, also designated "spectrum spreading technique". Thus, the signals emitted by the satellites are composed of a signal carrier modulated by a spreading code. More specifically, the signals emitted by the satellites are formed by modulation of the carrier of the signal with a spreading code formed by a pseudo-random binary sequence. The modulation of the carrier by a spreading code spreads the spectrum, which increases the resistance of the system to interferences. And, furthermore, that makes it possible to dissociate the satellites (by using a different spreading code for each satellite). In other words, the identification of the satellite emitting a radiofrequency signal can be done from the spreading code which is reserved to it. Hereinafter in the present invention, the term "code" will be used for simplification to designate the term "spreading code".

In the receiver, the satellite signal is received via at least one antenna (one antenna being able to comprise one or more sensors) and the information contained in a radiofrequency signal from the satellite is extracted by two successive demodulations, in order to deduce therefrom a measurement of propagation time, of Doppler or of carrier phase, and possibly of transmitted data: a first demodulation using a carrier generated locally by an oscillator driven by a frequency lock loop, called FLL, or phase lock loop, called PLL, also designated "carrier phase loop" or "carrier loop" making it possible to transpose the received signal into baseband and a second demodulation using a spreading code generated locally by a code generator driven by a delay lock loop called DLL, also designated "code loop" making it possible to demodulate the sequence of binary data present in the received signal. Generally, there is, at the receiver level, a satellite channel, with a spreading code for each channel specific to the satellite tracked, and a code loop and a carrier loop for each channel, as is explained for example in the patent application FR2892202.

The demodulation consists in interlocking a locally generated signal, so as to form an image of the signal received from the satellite considered, characterized by a specific spreading code and a carrier, that is to say by locally replicating the code, and by searching for the maximum of correlation between this received signal and the replicated signal (called "local signal"). The interlocking is performed by the carrier loop, which drives the phase of the local carrier, and by the code loop which drives the phase of the local code. The carrier loop measures a carrier phase deviation between the local signal and the received signal using the correlation with a local signal. The code loop measures a code phase deviation between the local signal and the received signal using the correlation with local signals modulated by derived codes (early, late or punctual). This demodulation phase is called the "locking phase". The term "locking" represents the capacity to be synchronized with the satellite signals by using, by feedback, the phase deviations between a local signal and a received signal.

The demodulation comprises, prior to the locking phase, an acquisition phase which makes it possible to initialize the operation of the lock loops. Indeed, neither the position (or phase) of the received code, nor the Doppler frequency is known a priori, so the lock loops can operate only if the position of the code and the Doppler frequency are close to those of the signal obtained from the satellite considered. The principle implemented in the acquisition phase is to try several hypotheses concerning the position of the spreading code, and concerning the Doppler value and to search for a correlation peak between the local signal and the received signal, with a sampling pitch that is fine enough not to miss the main peak of the self-correlation function of the spreading code.

"Self-correlation function" is understood to mean a correlation of the spreading code by the same code shifted in time and filtered. The function gives a correlation result as a function of the shift. The shift designated τ corresponds to an advance of the received code with respect to the local code. The values of the self-correlation function can be complex, with a real part and an imaginary part, notably because of the filtering applied to the received signal.

Once a peak has been found, the search for the phase of the code and of the Doppler is refined by reducing the sampling pitch, around the first peak detected. When the precision obtained is deemed sufficient, the procedure goes on to the locking phase: the loops are closed to make them converge toward the maximum of correlation. When the correlation peak is determined and the loops are closed, it is said that the loops are "locked on", and it is then considered that the spreading code generated locally is in phase with the code of the satellite sought contained in the received signal. This search for correlation peak is also called "locking on". It is specified that the term "peak" designates a local extremum, which can be a local maximum when it relates to absolute values.

The propagation time from a satellite is obtained at each instant by the difference between the time of emission of the received signal, calculated from the phase of the local code, an image of the received code, and the time of reception of the received signal, given by the clock of the receiver. Also, the positioning of the receiver is obtained by measuring the pseudo-distance between a satellite and the receiver from the propagation time of the signal between this satellite and the receiver.

An example of correlation calculation carried out in the acquisition phase is for example described in the patent application FR2898998. A spreading code is typically composed of a large number of elementary time divisions, called code "chips". In the patent application FR2898998, $D_{chip}$ designates the mean duration of the elementary time division of the code (during each chip, the code retains a constant value), C1(t) designates the local code generated by a receiver of a satellite positioning system, and S(t) designates the radionavigation signal received by the receiver, this analogue signal being sampled at a frequency $F_e$ greater than $2/D_{chip}$. A calculation of correlation between a received signal and a locally generated code is performed in several steps:

performing a sampling of the code C1 synchronous with the sampling of the received signal,
multiplying, pairwise, the samples of the code C1 and of the received signal, corresponding to one and the same sampling time, over the duration $D_{Code}$ to determine $N_{ech}$ results of sample products, $N_{ech}$ being the product of the frequency $F_e$ and of the duration $D_{code}$;
summing the results of sample products.

The result of the correlation calculation can thus be expressed in the following form:

$$\text{Correlation1} = \sum_{i=1}^{Nech} S(t_i) C1(t_i) \quad \text{[Math 1]}$$

in which i is a sampling index, $t_i$ is the i-th time of sampling of the received signal S, S(t) is the value of the signal S at the time $t_i$ and C1 (t) is the value of the code at the time $t_i$.

Despite the spectrum spreading technique, the satellite radionavigation systems can be disturbed by interfering sources, whether intentional or not, for example sources emitting a signal on a frequency close to that of the radionavigation signal or exhibiting harmonics about the frequency of the radionavigation signal, which can compromise the reliability of the satellite radionavigation system.

Techniques do exist for characterizing and eliminating these interfering sources.

For example, it is known practice to apply a processing to the received signals, and do so before their demodulation, which consists in cutting the received signal when such an interfering signal is detected, which leads to a disruption in the reception of the useful signals. This system is known by the term "blanking". Depending on the number of interfering signals received, the proportion of outages or "blankings" is more or less great and, at the limit, there is no longer enough signal received and there is then no way of recovering a useful signal.

Other techniques exist, such as those explained for example in the patent applications FR2981168 and FR3017716, which use a linear filter technique applied to the signals received by the receiver, and do so before their demodulation. The coefficients of the linear filter are calculated in such a way that the frequency response attenuates the energy of the interference in the frequency bands in which it is present. This can be a STAP filter, STAP being the acronym for "Spatio Temporal Adaptive Processing", used typically when the receiver comprises several antennas or a single antenna with several sensors or a TAP filter, TAP being the acronym for "Temporal Adaptive Processing", used when the receiver comprises an antenna with a single sensor. Another technique that is an alternative to TAP is an FDAF filter, FDAF being the acronym for "Frequency Domain Adaptive Filtering".

If the energy of an interference is situated at the centre of the spectrum of the satellite signal, the result thereof is a hole in the middle of the spectrum, the consequence of which is the appearance of secondary peaks alongside the main peak of the self-correlation function.

Now, as explained above, during the acquisition phase, a receiver or a satellite channel of the receiver searches for a correlation peak to lock on by locking the code and carrier loops. The loops remain locked onto a local peak of the correlation function during the locking phase. When there are several peaks in the correlation function, there is a risk of the satellite channel locking onto a secondary peak, potentially leading to significant or even inacceptable position errors, of up to several tens or even several hundreds of metres. According to the invention, this event will be called "false lock-on". A false lock-on can degrade the level of integrity of the satellite navigation system. The invention aims to overcome the abovementioned drawback.

SUMMARY OF THE INVENTION

The invention aims to provide a function for checking the integrity of a GNSS receiver comprising an anti-interference processing, more specifically a function capable of detecting a risk of false lock-on, in order to avoid a risk of undetected erroneous measurements.

Advantageously, if a risk of false lock-on has been detected, the invention aims to determine whether the risk is proven and therefore whether a false lock-on has actually occurred.

Advantageously, the invention aims to correct the proven lock-on fault.

The invention that makes it possible to resolve the abovementioned problems relates to a method for checking the integrity of the processing of a radionavigation signal emitted by a satellite of a satellite positioning system, said signal being received by a receiver comprising reception means and processing means, said processing means comprising a linear anti-interference filter, said integrity checking method being characterized in that it comprises at least a first phase of detection of a risk of false lock-on comprising the following steps:

a step of recovery of a nominal theoretical self-correlation function of the received signal not processed by the linear anti-interference filter;

a step of determination of a mean theoretical self-correlation function of said received signal and processed by the linear anti-interference filter over a defined integration period;

a step of determination of the number of local maxima of the modulus or of the modulus squared of the mean theoretical self-correlation function, a risk of false lock-on being detected if said number of local maxima is greater than or equal to two.

The unfiltered received signal has a nominal theoretical self-correlation function. The received and filtered signal has a theoretical self-correlation function which is modified by virtue of the filtering. The invention requires a knowledge of this modified theoretical self-correlation function.

Thus, the invention consists in calculating the mean theoretical correlation function of the signal received and processed by the linear anti-interference filter over a defined integration period. This mean theoretical self-correlation function informs on the presence of secondary peaks (therefore of at least two peaks, the main peak and at least one secondary peak) and therefore a risk of false lock-on. More broadly, the invention therefore consists in searching for the peaks of the mean theoretical self-correlation function.

The self-correlation function of a radionavigation signal emitted by a satellite is not generally real but complex (with a real part and an imaginary part), notably when an anti-interference filtering has been applied to the emitted signal. This is why there is a search for the maximum or maxima of the modulus or of the modulus squared of the mean theoretical self-correlation function. The case where the mean theoretical self-correlation function is real is a particular case.

A local maximum is defined as being a maximum over a non-zero interval. In practice, since the work is generally done on discrete values spaced apart by the sampling period Te, the interval can have a width equal to two times the sampling period Te (which can correspond to the minimum spacing between the early and late correlators as will be explained further hereinbelow).

According to one embodiment, the method comprises a step of determination of a mean impulse response by the anti-interference filter over the integration period, prior to the step of determination of the mean theoretical self-correlation function, said mean theoretical self-correlation function being determined from the nominal theoretical self-correlation function and from said mean anti-interference filter.

According to one embodiment, the mean impulse response by the anti-interference filter over the integration period is determined from the different values of the coefficients of the anti-interference filter calculated over said integration period.

According to one embodiment, the method further comprises: a step of definition of a first threshold, said first threshold being a function of the deviation between the maximum signal-to-noise ratio and a lock threshold; the number of local maxima determined corresponding to the number of local maxima for which the value of the modulus or of the modulus squared of the final mean self-correlation function is greater than or equal to said first threshold.

In particular, the first threshold is defined by the mathematical relationship Math40 defined further hereinbelow and reproduced here:

$$S1 = \frac{\max(\|\max(A_0)\|^2)}{10^{\frac{x}{10}}}$$

in which x represents the deviation between the maximum signal-to-noise ratio and a lock threshold and A0 represents the nominal theoretical self-correlation function.

According to one embodiment, the method further comprises a step of triggering of an alarm if the number of local maxima determined is greater than or equal to two.

According to an embodiment in which the received signal processing means comprise a processing channel for each satellite, each channel comprising a code loop capable on the one hand of locally generating a spreading code characteristic of the satellite associated with said channel so as to form a local signal and capable on the other hand of interlocking said local signal with said received signal by using a correlation pathway between said received signal and said local signal, the integration period is determined as a function of the period of said code loop, also called "code period".

According to a particular embodiment, the integration period is substantially equal to the loop period.

According to an embodiment in which the received signal processing means comprise a processing channel for each satellite, each channel comprising a code loop capable of locally generating spreading codes characteristic of the satellite associated with said channel, said codes comprising at least one punctual code, one late code and/or one early code each forming a local signal, each punctual, late and/or early local signal being correlated with the received signal by using, respectively, a punctual correlation pathway, a late correlation pathway and/or an early correlation pathway, the method further comprises a second phase of detection of a false lock-on, said second phase comprising:

a step of calculation of probability between the mean theoretical self-correlation function and a measured self-correlation function for each of the set of the punctual, late and/or early correlation pathways;

a step of comparison of the result of probability calculation with a second threshold, a false lock-on being detected by a result of the probability calculation lower than said second threshold.

According to a particular embodiment, the result of the step of probability calculation uses a nominal probability criterion defined by the mathematical relationship Math41 defined hereinbelow and reproduced here:

$$\text{Criterion0} = \frac{\left(\sum_{i=1}^{NC} A(q_i) \cdot A_{mes}(q_i)\right)^2}{\left(\sum_{i=0}^{NC} \|A(q_i)\|^2\right)\left(\sum_{i=0}^{NC} \|A_{mes}(q_i)\|^2\right)}$$

in which $q_i$ is the position of the correlator n° i and NC is the number of correlation pathways.

According to one embodiment, the method further comprises a third phase of searching for the main local maximum, said third phase performing a search for the main local maximum if the result of the probability calculation is lower than the second threshold, and comprising the following steps:

a j-th step of calculation of probability between the mean theoretical self-correlation function translated by a j-th translation value relative to the position of the correlation pathways, and the measured self-correlation function for each of the set of the correlation pathways, the j-th translation value corresponding to a j-th local maximum;

a step of comparison of the result of the j-th probability calculation with a third threshold, a result of said j-th probability calculation above said third threshold making it possible to determine whether the j-th translation value corresponds to the main local maximum.

The calculation is performed for each j-th local maximum determined in the first phase of detection of a risk of false lock-on. Thus, j is at least equal to two. Preferably, a third threshold is set so as to be assured of determining the main local maximum. If at least two local maxima are found above the third threshold, it is possible to record the third threshold or reproduce the probability calculation by considering a fourth threshold above the third threshold.

According to a particular embodiment, the result of the step of probability calculation uses a j-th probability criterion defined by the mathematical relationship Math42 defined hereinbelow and reproduced here:

$$\text{Criterion } j = \frac{\left(\sum_{i=1}^{NC} A(q_i + d_i) \cdot A_{mes}(q_i)\right)^2}{\left(\sum_{i=0}^{NC} \|A(q_i + d_i)\|^2\right)\left(\sum_{i=0}^{NC} \|A_{mes}(q_i)\|^2\right)}$$

in which $d_j$ is the j-th translation value, $q_i$ is the position of the i-th correlation pathway and NC is the number of correlation pathways.

The invention relates also to a receiver of a satellite positioning system comprising reception means capable of picking up a signal emitted by said satellites and processing means capable of processing the received signal, said processing means comprising a linear anti-interference filter, said receiver comprising a first function capable of implementing the first phase of determination of a risk of false lock-on of the method according to the invention.

According to one embodiment, the receiver further comprises a second function coupled to the first function and capable of implementing the second phase of detection of a false lock-on of the method according to the invention.

According to one embodiment, the receiver further comprises a third function coupled to the first function and the second function and capable of implementing the third phase of searching for the main local maximum of the method according to the invention.

Thus, the invention makes it possible to have an integrity checking method and function for a receiver of a system for processing satellite or pseudolite radionavigation signals, and more specifically for a receiver comprising anti-interference processing. The invention makes it possible to detect a risk of false lock-on, as defined above, in order to avoid a risk of undetected erroneous measurements. The invention at the very least makes it possible to transform a non-integrity into non-continuity, in other words namely that the receiver prefers not to supply measurements, rather than risking of supplying an erroneous measurement without warning. For example, in this case, an aircraft pilot will be able to choose to divert the aircraft or to delay the landing for the time it takes to find position measurements that are guaranteed integral by the receiver, thus avoiding a risk of accident.

Furthermore, by virtue of the second phase of detection of a false lock-on, the invention makes it possible to check whether the risk of false lock-on is proven or not. That makes it possible to avoid a non-continuity of the measurement by reducing the risk of false alarm. For example, in the case of an aircraft landing, that makes it possible to avoid a costly, even dangerous, diversion.

Finally, in case of proven false lock-on, the third phase of searching for the main local maximum makes it possible to rapidly find an integral measurement by avoiding repeating an acquisition phase, which is generally time-consuming, thus reducing the time of non-continuity of the measurement.

Generally, the method according to the invention comprises operations which can be executed rapidly and which are simple to implement. They do not significantly increase the workload of the one or more processors that are in place. The invention can notably be implemented in the form of additional code lines added to one or more of the existing processors and/or printed circuits or more generally to any suitable medium for implementing code lines in the receiver. Thus, the invention does not require the entire design of the receiver to be revised.

BRIEF DESCRIPTION OF THE DRAWINGS

Other features and advantages of the invention will become apparent from the following description, given in an illustrative and nonlimiting manner, in light of the attached figures in which:

FIG. 7A represents two theoretical and measured self-correlation functions, illustrating a good lock-on;

FIG. 7B illustrates two theoretical (solid line) and shifted theoretical (dotted line) self-correlation functions, the shifted illustrating a false lock-on.

DETAILED DESCRIPTION

Figure 1:
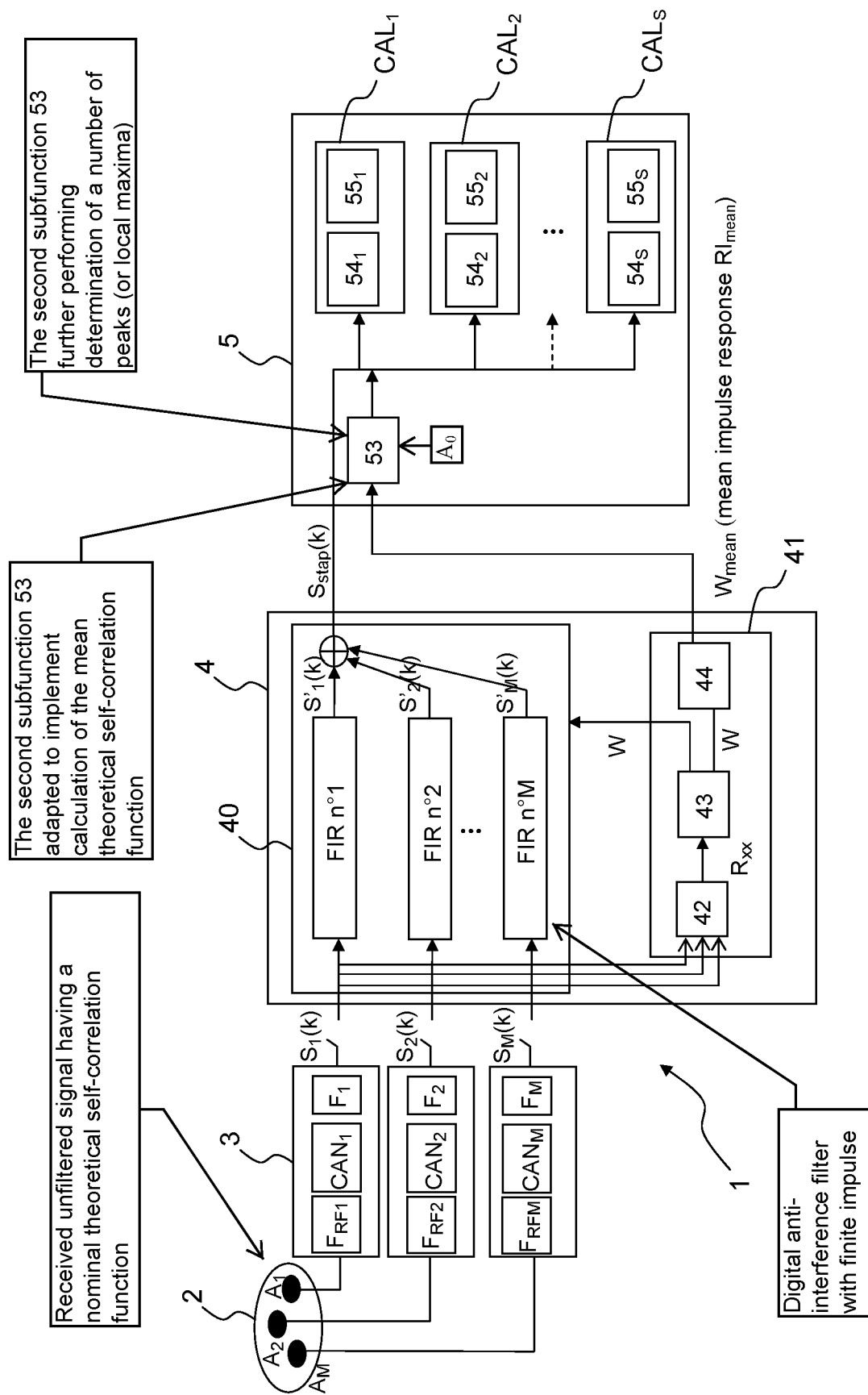
FIG. 1 represents an example of GNSS receiver according to the invention.

The detailed description of the invention is based on an example of a method for anti-interference processing of a radiofrequency signal emitted by a satellite, said method comprising the following steps:

reception, at M distinct input points (antennas and/or sensors) of said radiofrequency signal;

determination of the correlation between two signal samples obtained from the reception, at L distinct instants and at said M input points, of said signal, then determination of weighting coefficients W as a function of said determined correlation, M and L being positive integers, M being strictly greater than or equal to 1, and L being strictly greater than 1;

acquisition of a processed anti-interference signal ($S_{processed}$) by linear combination of said signal samples obtained from the reception at L distinct instants, at said M input points and weighted by said weighting coefficients W.

The anti-interference processing is performed at receiver level.

An example of anti-interference processing is a STAP filter (STAP being the acronym for "Spatio Temporal Adaptive Processing"), and in this case, $S_{processed}$ is $S_{stap}$; or a TAP filter (TAP being the acronym for "Temporal Adaptive Processing") if M is equal to 1 (a single antenna with a single sensor), and in this case $S_{processed}$ is $S_{tap}$; or even an FDAF filter (FDAF being the acronym for "Frequency Domain Adaptive Filtering"), and in this case $S_{processed}$ is $S_{fdaf}$.

To recap, in a satellite positioning system, several satellites transmit radiofrequency (RF) signals. A receiver, positioned at the position to be located, receives the satellite signals using M input points (antennas or sensors), and digitizes them. Then, the receiver can perform an anti-interference processing on these received signals, for example using one of the STAP, TAP or FDAF methods according to which the processed signal is a linear combination of the signals received on the M sensors and of their L delayed versions, weighted by weighting coefficients W calculated to reject the interference while conserving the useful satellite signals. The linear filter is applied with coefficients W that are re-updated periodically according to a refresh period $T_w$ as a function of the interference encountered and characterized for example by its intercorrelation matrix calculated on the received signal. Thus, the signal processing requires the prior calculation of an intercorrelation matrix, called $R_{xx}$, to characterize the interferences to be eliminated.

Downstream of the anti-interference processing, the receiver performs a processing in two successive phases of the anti-interference processed signal, an acquisition phase and a locking phase. The aim of the acquisition phase is to synchronize a code and a carrier generated in the receiver with the code and the carrier of the signal received from the satellite and preprocessed as illustrated below. The synchronization criterion corresponds to the maximum of the correlation of the two signals, that is to say the search for a peak in the results of correlation between the received signal and the local signal, which, as indicated above, is also called "lock-on".

The aim of the invention is to detect a risk of false lock-on. A detection of false lock-on constitutes a means for checking the integrity of the processing of the signal received in the receiver.

Next, the aim of the locking phase is to maintain the best synchronization of the local code and of the phase of the local carrier with the code and the phase of the carrier of the received signal, so as to produce a measurement of the position of the code and of the phase of the carrier for the receiver positioning calculation. This locking phase consists in locking the code lock (DLL) and carrier lock (PLL) loops. Then, the receiver estimates the distances which separate it from the satellites from the propagation times of the demodulated satellite signals, and then determines the location sought by triangulation on the basis of these distances.

FIG. 1 represents an example of receiver 1 of a satellite navigation system using signals originating from S satellites $SAT_s$ (s=1 to S) and comprising an integrity checking function according to the invention. The receiver 1 illustrated implements an anti-interference processing. Each satellite $SAT_s$ of the system generates a radiofrequency signal using a sinusoidal carrier (1.2 to 1.6 GHz frequency), modulated by a known binary spreading code specific to each satellite (1 to 10 MHz frequency), then emits the duly generated radiofrequency RF signal. The spreading codes are composed of a large number of elementary time divisions, called code "chips" which have a duration equal to Tc.

The receiver 1 comprises satellite signal reception means 2, for example an antenna with controlled radiation pattern CRPA (CRPA being the acronym for "Controlled Radiation Pattern Array") comprising M sensors $A_m$, m varying between 1 and M, with M being an integer number greater than or equal to 1. In FIG. 1, three sensors are represented (M is therefore equal to 3).

The receiver 1 further comprises a preprocessing module 3 comprising M pathways, an anti-interference processing module 4 and a module 5 for determining the location of the receiver which comprises means for demodulating the received, preprocessed and anti-interference processed signal.

Each of the M sensors is adapted to pick up the radiofrequency RF signals present in its operating frequency band, then to deliver an analogue radiofrequency signal such as $S_m(t)$, m=1 to M, to the preprocessing module 3.

The preprocessing module 3 comprises M parallel pathways each corresponding to a sensor $A_m$. Each pathway m of the preprocessing module 3 comprises at least one analogue filter $F_{RFm}$, one analogue-digital converter $CAN_m$ performing a sampling and a digitizing of the signal $S_m(t)$, at the sampling frequency Fe (the sampling period Te being the inverse of the sampling frequency Fe), and a module $F_m$ for switching to baseband in which the real digitized received signal is multiplied by a complex digital signal of type $\exp(2j\pi Fe/4\ t_k)$ and delivers at the output of the pathway number m, to the anti-interference processing module 4, the samples $S_m(k)$ of a complex digital signal in which the integer k indicates the index of a sampling instant $t_k$, m is the sensor index (m=1 to M) and $t_k$ is equal to:

$$t_k = t_0 + k/Fe \qquad \text{[Math2]}$$

in which $t_0$ is the start of the sampling.

The anti-interference processing module 4 comprises a main block 40 for rejecting interferences and a secondary block 41 for determining weighting coefficients used by the main block 40.

Figure 2:
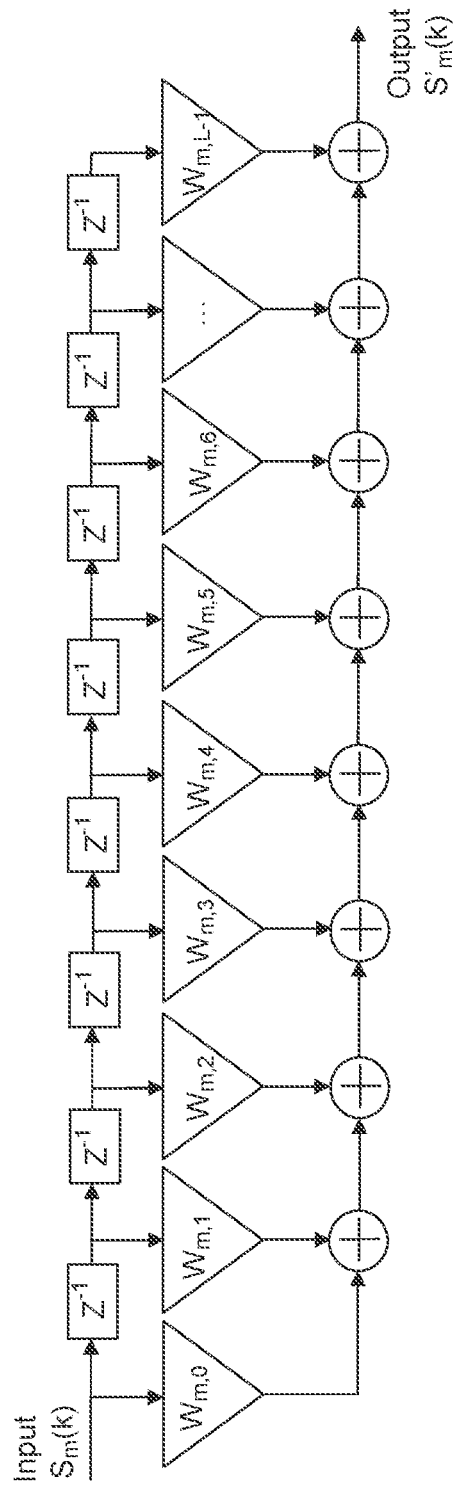
FIG. 2 is a detailed view of the function performed by a linear anti-interference filter FIR n° m of FIG. 1.

The main block 40 for rejecting interferences is adapted to perform the linear filtering processing STAP. It comprises M parallel pathways, operating at the frequency Fe. The signal $S_m(k)$ y is received therein at the input of the same pathway m, then is supplied to the input of a digital filter with finite impulse response (called "FIR n° m") which is illustrated in more detail in FIG. 2. The FIR n° m comprises L−1 complex unitary delay elements produced by the operator $Z^{-1}$. The complex output of each delay element of index I is multiplied by a complex weighting coefficient $W_{m,l}$. The signal at the output of the FIR filter number m is equal to the sum of the complex outputs of the L−1 elements multiplied by the complex weighting coefficients.

Thus, FIR n° m delivers at the output a signal:
[Math3]

$$S'_m(k) = \sum_{i=0\,to\,L-1} W_{m,l} \cdot S_m(k-l) \quad \text{[Math 3]}$$

The signals $S'_m(k)$ are then summed for m lying between 1 and M in the main block 40. That is equivalent to the formula:
[Math4]

$$S_{step}(k) = \sum_{m=1\,to\,M} \left( \sum_{i=0\,to\,L-1} W_{m,l} \cdot S_m(k-l) \right) \quad \text{[Math 4]}$$

In which m is the index of the sensors (lying between 1 and M), l is the index of the delays (lying between 0 and L−1), k is the index of the sampling instant.

The secondary block 41 for determining weighting coefficients is adapted to determine the updated values (according to the refresh period $T_w$) of the weighting coefficients $W_{m,l}$ used by the main block 40.

In the embodiment considered, the secondary block 41 comprises an intercorrelation sub-block 42 and a sub-block 43 for calculating weighting coefficients.

The intercorrelation sub-block 42 is adapted to calculate the correlation between the signals obtained from the M different sensors, and/or their versions delayed by 0 to L−1 samples, for example via the calculation of the intercorrelation matrix $R_{xx}$.

The matrix $R_{xx}$ can be represented in the form of a matrix with matrix coefficients:
[Math5]

$$R_{xx} = \begin{bmatrix} [R_0] & \cdots & [R_l^{*T}] & [R_{l+1}^{*T}] & [R_{l+2}^{*T}] & \cdots & [R_{L-1}^{*T}] \\ \vdots & & \vdots & \vdots & \vdots & & \vdots \\ [R]_l & & [R_0] & [R_1^{*T}] & [R_2^{*T}] & & [R_{l+2}^{*T}] \\ [R_{l+1}] & & [R_1] & [R_0] & [R_1^{*T}] & & [R_{l+1}^{*T}] \\ [R_{l+2}] & & [R_2] & [R_1] & [R_0] & & [R_l^{*T}] \\ \vdots & & \vdots & \vdots & \vdots & & \vdots \\ [R_{L-1}] & \cdots & [R_{l+2}] & [R_{l+1}] & [R_l] & \cdots & [R_0] \end{bmatrix}_{LM \times LM} \quad \text{[Math 5]}$$

$R_{xx}$ has its matrix coefficients identical on each diagonal (Toeplitz matrix). Furthermore, $R_{xx}$ is symmetrical, in the hermitian type (i.e. $R^T$ is equal to $R^*$), like $R_0$.

For l varying from 0 to L−1, the following applies:
[Math6]

$$R_l = \begin{bmatrix} r_{1,1,l} & \cdots & r_{1,m,l} & \cdots & r_{1,M,l} \\ \vdots & & \vdots & & \vdots \\ r_{m,1,l} & \cdots & r_{m,m,l} & \cdots & r_{m,M,l} \\ \vdots & & \vdots & & \vdots \\ r_{M,1,l} & \cdots & r_{M,m,l} & \cdots & r_{M,M,l} \end{bmatrix}_{M \times M} \quad \text{[Math 6]}$$

The coefficients $r_{m,n,l}$ of the matrix $[R_l]$ are obtained by the formula:

$$r_{m,n,l}(i) = \int_{(i-1)T_W}^{iT_W} \rho_{m,n,l}(t)dt = \Sigma_{(i-1)T_W/T_e}^{iT_W/T_e} S_m(k) \cdot S_n(k-l)^* \quad \text{[Math7]}$$

in which S* is the conjugate of S, ρ is the product of the signal S(t) with a shifted version of the signal as illustrated below in relation to FIGS. 3 and 4, m and n correspond to sensors (between 1 and M), l is a delay of the signal (between 0 and L−1), Te is the digitization sampling frequency of the signal S, k is the sampling instant index, $T_w$ is the refresh period of the coefficients W, i is the index of the renewal interval of the coefficients W.

Figure 3:
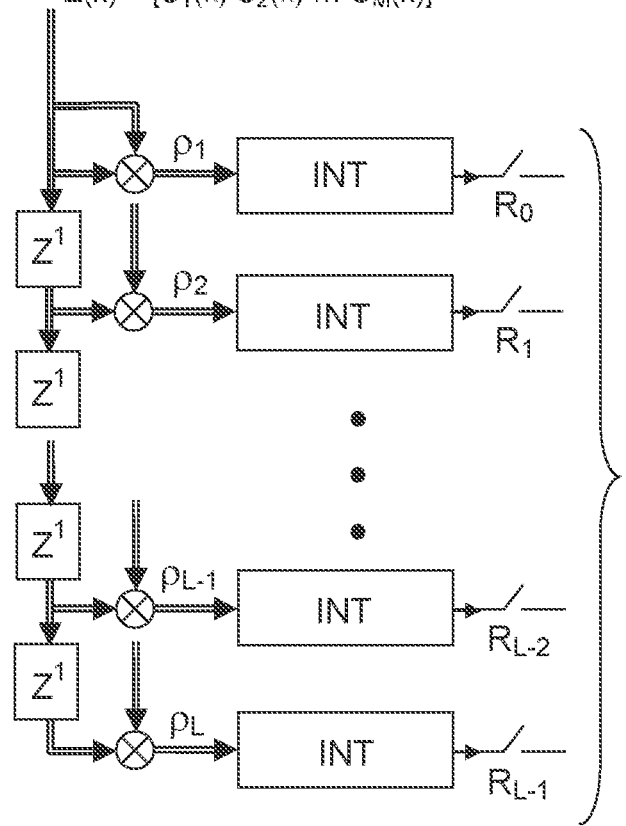
FIG. 3 is a detailed view of a part of the view represented in FIG. 1 illustrating a mode of calculation of the intercorrelation matrix Rxx.

FIG. 3 illustrates a particular embodiment in which the M signals from the sensors supplied as input for the secondary sub-block 41, sampled at the frequency Fe, are represented by the vector Z(k), of dimension M, with:

$$Z(k)=[S_1(k),\ldots,S_m(k),\ldots,S_M(k)] \quad \text{[Math8]}$$

The signal vector Z(k) is supplied to the input of the intercorrelation sub-block 42. In the intercorrelation sub-block 42, the signal vector Z(k) is supplied to a delay line comprising L−1 elements $Z^{-1}$ disposed in series. The signal vector Z(k−l) resulting from each l unitary delay (l varying between 0 and L−1) is supplied as input to a set of complex multipliers in which each of its complex coordinates $S_m(k-l)$ (m varying between 1 and M), is multiplied by the conjugate of each complex coordinate $S_n(k)$ of Z(k), in which m and n correspond to sensors and lie between 1 and M. The result of these multiplications is a matrix $\rho_l$ of size M×M, the elements $\rho_{n,m,l}$ of which are obtained by the following formula:

$$\rho_{n,m,l}(k,Te)=S_m(k-l) \times S_n(k)^* \quad \text{[Math9]}$$

With n and m lying between 1 and M.

Figure 4:
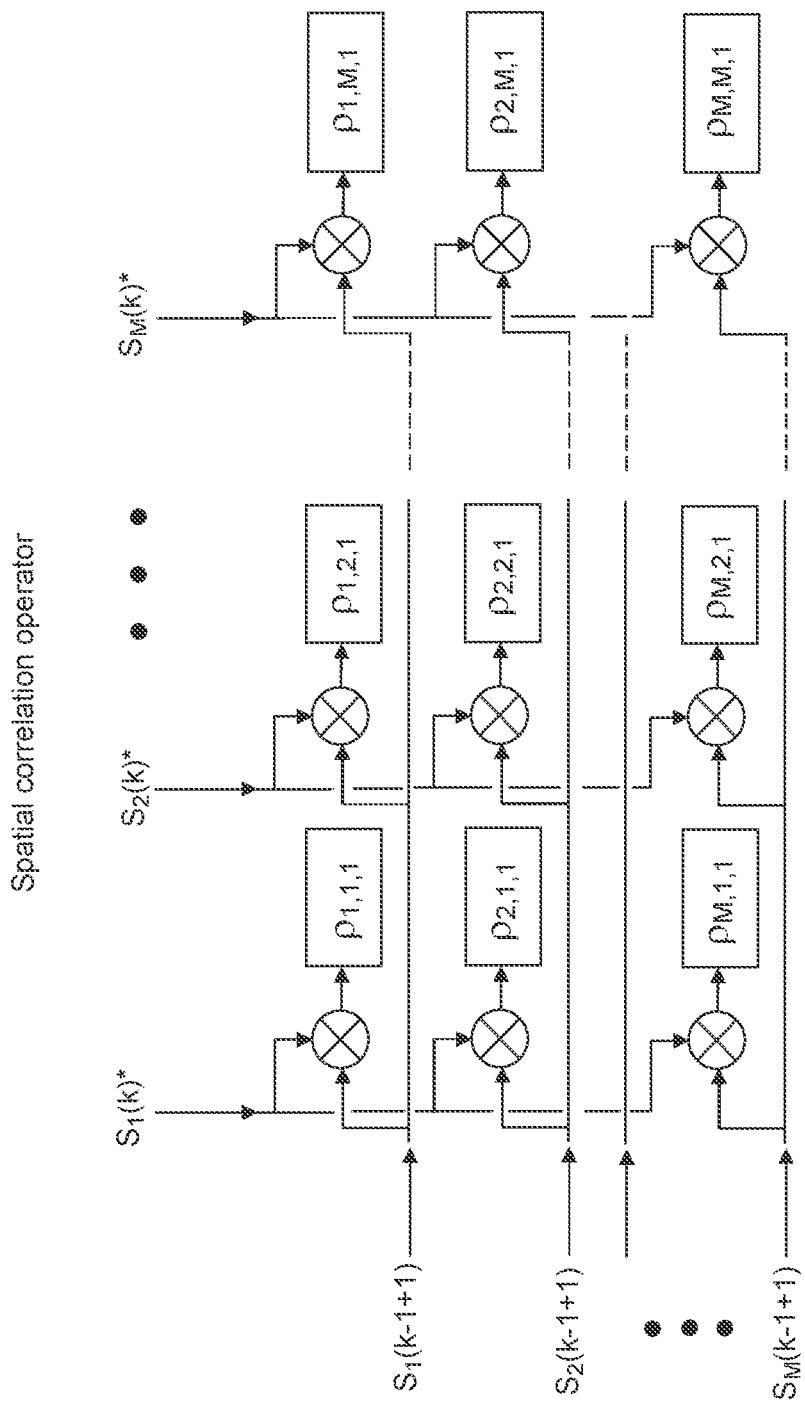
FIG. 4 illustrates in more detail the calculation of the intercorrelation matrix $R_{xx}$ represented in FIG. 3.

FIG. 4 illustrates in more detail the spatial correlation operator that makes it possible to obtain the terms $\rho_{n,m,l}$ of the matrix pi.

Referring to FIG. 3, in the intercorrelation sub-block 42, the duly defined matrix $\rho_l$ is delivered to an integrator INT which is adapted to perform, on each term of the matrix, an integration over a time interval of duration Tw. The integrator thus delivers the result of the integration of the matrix $\rho_l$ which makes it possible to obtain the matrix $[R_l]$, a sub-element of the intercorrelation matrix $R_{xx}$, by the following formula:

$$[R_l] = \int_{(i-1)T_W}^{iT_W} \rho_l(t)dt \quad \text{[Math10]}$$

From the matrix $R_{xx}$, the weighting coefficients $W_{m,l}$ are then calculated at the end of each refresh period $T_w$.

The sub-block 43 for calculating weighting coefficients is adapted to calculate the updated weighting coefficients $W_{m,l}$ as a function of the updated matrix $R_{xx}$ and supply these weighting coefficients to the main block 40.

In one embodiment, the Capon method is used to determine the weighting coefficients W on the basis of the following equation:
[Math11]

$$W = \frac{R_{xx}^{-1}C}{C^T R_{xx}^{-1} C} \quad \text{[Math11]}$$

In which C is the constraint vector and W is the vector of the weighting coefficients, the latter being able to be expressed in vector form as follows:

$$W=[W_1 W_2 \ldots W_m \ldots W_M] \quad \text{[Math12]}$$

And in which $W_m$ can also be expressed in the vector form as follows:

$$W_m=[W_{m,0} W_{m,1} \ldots W_{m,l} \ldots W_{m,L-1}] \quad \text{[Math13]}$$

The constraint vector C is a vector determined for each satellite (it is determined so as to conserve the power of the useful signals originating from the satellites). It can be expressed by the following Kronecker product:

$$C = C_{temporal} \otimes C_{spatial} \quad [\text{Math}14]$$

$$C_{temporal} = \begin{bmatrix} ct_1 \\ \vdots \\ ct_{(L-1)/2} \\ \vdots \\ ct_L \end{bmatrix}_{L \times 1} \quad [\text{Math}15]$$

$$C_{spatial} = \begin{bmatrix} cs_1 \\ \vdots \\ cs_M \end{bmatrix}_{M \times 1} \quad [\text{Math}16]$$

$$C = \begin{bmatrix} \begin{bmatrix} ct_1 \cdot cs_1 \\ \vdots \\ ct_1 \cdot cs_M \end{bmatrix} \\ \vdots \\ \begin{bmatrix} ct_L \cdot cs_1 \\ \vdots \\ ct_L \cdot cs_M \end{bmatrix} \end{bmatrix}_{LM \times 1} \quad [\text{Math}17]$$

The coefficients of the temporal constraint vector $C_{temporal}$ can be obtained from the transfer function $H_{F_{RF}}$ of the analogue filter $F_{RF}$, i.e.:

$$ct_l = \int_{-Fe/2}^{+Fe/2} H_{F_{RF}}(f) \cdot e^{-(2j\pi \cdot (l-l0) \cdot Te \cdot f)} \cdot df \quad [\text{Math}18]$$

in which $l_0$ is equal to $(L+1)/2$ and in which f is the frequency.

It is not necessary to have a fine modelling of the transfer function of the analogue filters $F_{RFm}$. A mask having the value 1 or 0 depending on whether the frequency is within the bandwidth of the filter or not is sufficient: $H_{filter\_RF}(f)$ is equal to 1 if f belongs to the bandwidth of the filter, $H_{filter\_RF}(f)$ is equal to 0 otherwise.

The coefficients of the spatial constraint vector $C_{spatial}$ are obtained from the phase differences $\theta_m$ between the sensors for the chosen satellite direction, i.e.:
[Math19]

$$C_{spatial} = \begin{bmatrix} \exp(j\theta_1) \\ \vdots \\ \exp(j\theta_M) \end{bmatrix}_{M \times 1} \quad [\text{Math}19]$$

It will be noted that, when the antenna has only a single sensor (M is equal to 1), the STAP processing according to the invention is reduced to a TAP processing (Temporal Adaptive Processing). All the formulas given above are therefore the same, with M equal to 1. In particular in this case, the spatial constraint vector $C_{spatial}$ is equal to 1 and thus the constraint vector C is equal to the temporal constraint vector $C_{temporal}$.

The signal resulting from the antiscrambling processing $S_{stap}(k)$ is delivered at the output of the main block 40 and is supplied as input to the module 5 for determining the location of the receiver.

The module 5 for determining the location of the receiver generally comprises several processing channels $CAL_s$, s=1 to S, a channel corresponding to a satellite. Each processing channel $CAL_i$ is adapted to demodulate the signal emitted by the satellite $SAT_s$ using a PLL or FLL loop and a DLL loop. The temporal shift between the signal emitted by the satellite $SAT_s$ at a time to be determined and this signal received by the receiver at a known time corresponds to the signal propagation time sought. In each channel $CAL_s$, a replica of the emitted spreading code is generated locally. A phase alignment between the received signal and the local signal is performed. The phase-aligning criterion corresponds to the maximization of the correlation of the two signals, different shift hypotheses being considered for each correlation calculation.

The module 5 is also adapted to determine the location of the receiver 1 as a function of the propagation times of the signals determined, for the different satellites, by triangulation.

Figure 5:
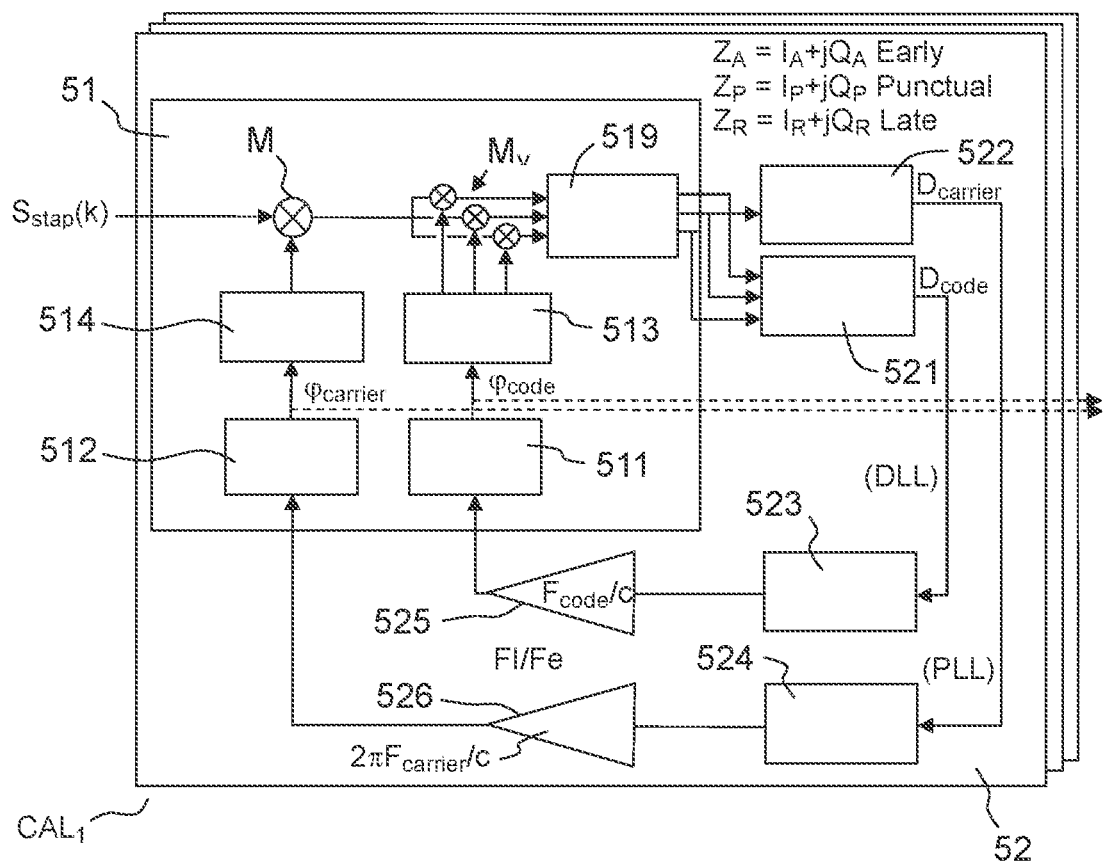
FIG. 5 illustrates a module for determining the location of a GNSS receiver.

These operations are briefly illustrated in FIG. 5 which illustrates a processing channel $CAL_1$. In the embodiment illustrated, the processing channel $CAL_1$ comprises a hardware module 51 and a software module 52.

The hardware module 51 receives the complex signal $S_{stap}(k)$ delivered at the output of the main block 40. It is configured to generate the local code and the local carrier, generating local signals, and to then correlate them with the signal that it receives. It can be clocked at a relatively high frequency, of a few MHz, for example of the order of 50 MHz.

The hardware module 51 comprises a digital local carrier phase integrator 512 generating, from a first appropriate control signal, a phase of the local carrier $\varphi_{local\_carrier}$ allowing for the generation of a complex local carrier from a carrier generator 514. The hardware module 51 firstly allows for a demodulation of the carrier, through a multiplication of the digitized signal by the complex local carrier, by means of a multiplier M.

The hardware module 51 also comprises a digital code phase integrator 511 generating, from a second appropriate control signal, a local code phase $\varphi_{code\_local}$ allowing for the generation of a local spreading code specific to the satellite to which the channel considered is dedicated from a local code generator 513. The hardware module 51 secondly allows for a demodulation of the code, by a multiplication of the carrier-demodulated signal from the abovementioned multiplier M by a local code generated by the local code generator 513.

The local code generator 513 can generate a plurality of local codes: the so-called "punctual" local code, and one or more early and/or late local codes relative to the punctual local code. In the example illustrated by FIG. 5, the local code generator 513 generates a punctual local code, a so-called "late" local code, corresponding to the punctual local code delayed by a delay d for example equal to 0.5 chip, and a so-called "early" local code, corresponding to the punctual local code advanced by the delay d. Thus, the demodulation of the code described previously can be performed in parallel on different pathways corresponding to the different local codes generated, by means of a plurality of correlation multipliers Mv disposed in parallel.

The complex signals at the output of the correlation multipliers Mv can then be integrated coherently by a correlation integrator 519, producing samples of digitized signals forming the correlation pathways. In the example illustrated by FIG. 5, three correlation pathways are thus derived from the correlation integrator 519: a punctual pathway, a late pathway and an early pathway, that can be formalized by complex signals, respectively: $Z_P$, $Z_R$ and $Z_A$.

These complex correlation signals can then be exploited by the software module 52. Thus, the correlation integrator 519 can be clocked at a lower frequency, corresponding to the working frequency of the software module 52, typically of the order of a few tens of Hz, for example 50 Hz. The corresponding period is called loop period $T_{loop}$. That way, the correlation integrator 519 performs an integration every 20 ms ($T_{loop}$).

The software module 52 makes it possible to generate the control signals of the digital local carrier phase integrator 512 and of the digital code phase integrator 511, respectively via the interlocking of a code loop DLL and of a carrier phase loop PLL, so that the local carrier is in phase with the received carrier, and so that the local code of the punctual pathway is in phase with the received code.

The code loop DLL comprises a code discriminator 521 receiving as input the different complex signals from the correlation pathways formed by the outputs of the correlation integrator 519, and restoring at the output a signal $D_{code}$ representative of the difference τ between the received code $\varphi_{code\_received}$ and the phase of the local code $\varphi_{local\_code}$. Said signal $D_{Code}$ is supplied to a code corrector 523, the latter generating speed code commands, at the working frequency of the software module 52, that is to say for example every 20 ms. The speed code commands are applied to the input of a code command amplifier 525 restoring the second control signals in terms of number of chips per sampling period for the attention of the digital code phase integrator 511.

Similarly, the carrier phase loop PLL comprises a carrier discriminator 522 receiving as input the signal from the punctual correlation pathway formed by the corresponding output of the correlation integrator 519, and restoring as output a signal $D_{carrier}$ representative of the phase difference Asp between the carrier phase of the received signal $\varphi_{received\_carrier}$ and the local carrier phase $\varphi_{local\_carrier}$. Said signal $D_{carrier}$ is supplied to a carrier corrector 524, the latter generating speed carrier commands, at the working frequency of the software module 52. The speed carrier commands are applied to the input of a carrier command amplifier 526 restoring the first control signals in terms of cycles per sampling period for the attention of the digital local carrier phase integrator 512.

The receiver 1 also comprises a first function allowing for the implementation of a first phase of determination of a risk of false lock-on of the method according to the invention.

It has been seen that the correlation calculations are performed over the period $T_{loop}$ of the code and carrier loops and on the basis of the signal $S_{stap}(k)$ delivered at the output of the main block 40, which, by virtue of the processing thereof in the anti-interference filter, is renewed every refresh period $T_w$ of the coefficients W of the filter. Thus, on each refresh period $T_w$, the change of the coefficients W of the filter is likely to change the frequency characteristics of the signal $S_{stap}(k)$. These changes occur at a much faster frequency than the response time of the lock loops, or period of the loops ($T_{loop}$). To give an order of magnitude, the refresh period $T_w$ can vary between 1 microsecond (1 MHz) and 1 millisecond (1 kHz) whereas the period Troop of the lock loops can vary between 1 millisecond (1 kHz) and 200 milliseconds (5 Hz).

According to the embodiment presented, the first phase of determination of a risk of false lock-on of the method comprises a first step of determination of the mean impulse response over an integration period $T_{mean}$.

The first function can be implemented with a first subfunction 44. The first subfunction 44 is adapted to implement the first step of determination of the mean impulse response over an integration period $T_{mean}$.

The integration period $T_{mean}$ is equal to the period over which the filters are averaged. The integration period is defined relative to the loop period $T_{loop}$, is even substantially equal to the loop period $T_{loop}$. The integration period $T_{mean}$ can coincide with the loop period $T_{loop}$ or the two periods can have different values.

The integration period $T_{mean}$ can vary typically between 1 and 200 milliseconds, for example be equal to 20 milliseconds.

In the mode illustrated in FIG. 1, the first second subfunction 44 (or averaging subfunction) is implemented in the anti-interference processing module 4 and more specifically in the secondary block 41 of said module. The first subfunction 44 is coupled to the weighting coefficient calculation sub-block 43 so as to receive as input the coefficients W (and therefore be able to average them).

The first step of determination of the mean impulse response can comprise the determination of the mean transfer function of the anti-interference filter. The calculation is facilitated by starting from the impulse response of the filter.

In the case of a digital filter of FIR type with finite impulse response, the coefficients W directly give the impulse response RI. It is sufficient to calculate the average of the coefficients over the integration period $T_{mean}$ to obtain the mean impulse response. The means coefficients can be determined using the following formula:

[Math20]

$$W_{mean} = \sum_{u=1}^{\frac{T_{mean}}{T_W}} W(u) \qquad [\text{Math20}]$$

The mean impulse response $RI_{mean}$ is given by:

$$RI_{mean} = W_{mean} \qquad [\text{Math21}]$$

In the case of a digital filter of IIR type, with infinite impulse response, it is necessary to calculate the impulse response for each set of coefficients of the filter (numerator N and denominator D), then calculate the average thereof, i.e.

$$S_{output}(k) = \sum_{l=0}^{L_n-1} N_l \cdot S_{input}(k-l) - \sum_{l=0}^{L_d-1} D_l \cdot S_{output}(k-l) \qquad [\text{Math22}]$$

$$N = [N_0\ N_1\ N_2\ ...\ N_{L_n}] \qquad [\text{Math23}]$$

$$D = [D_0\ D_1\ D_2\ ...\ D_{L_d}] \qquad [\text{Math24}]$$

The mean impulse response $RI_{mean}$ is calculated from the instantaneous impulse response RI(u) (and no longer from the coefficients W), i.e.:

[Math25]

$$RI_{mean} = \sum_{u=1}^{\frac{T_{mean}}{T_W}} RI(u) \qquad [\text{Math25}]$$

To calculate S(k), the equation of the filter is used, with, as input:

$$S_{input}=[1\ 0\ \ldots\ 0\ 0]\quad\text{[Math26]}$$

And, for initial conditions:

$$S_{output}(q)=0\text{ for }q<0\quad\text{[Math27]}$$

The following is thus obtained:

$$RI=[S_0 S_1\ \ldots\ S_l\ \ldots\ S_L]\quad\text{[Math28]}$$

With $$S_l=S_{output}(l)\quad\text{[Math29]}$$

The length L depends on the choice of the coefficients N and D, the calculation is stopped when the value of $S_l$ becomes negligible and if a limit value $L_{max}$ set in advance is reached.

It should be noted that, in the case of a STAP anti-interference filter, if considering a different spatial constraint vector for each tracked satellite $SAT_s$, dependent of the direction of arrival of the signal, it is preferably necessary to calculate a mean transfer function (or mean impulse response) for each spatial direction used. There will therefore be a mean impulse response for each satellite $SAT_s$ which is given by:

$$RI_{mean\ sat_s}=W_{mean\ sat_s}=\quad\text{[Math 30]}$$
$$\sum_{m=1}^{M}C_{spatial\ sat_s,m}\cdot W_{mean\ sat_s,m}=\sum_{m=1}^{M}e^{-j\theta_{sat_s,m}}\cdot W_{mean\ sat_s,m}$$

In which M is the number of sensors and m is the sensor index.

The mean impulse response is calculated for the filter of each sensor pathway m, independently of the satellite, by the following formula:
[Math31]

$$W_{mean,m}=\sum_{u=1}^{\frac{T_{mean}}{T_W}}W_m(u)\quad\text{[Math31]}$$

In the case where there is a single spatial constraint vector, there is only one valid impulse response for all the satellites. For simplification in the rest of the description, this case is considered, and the mean impulse response is designated $RI_{mean}$.

The first phase of determination of a risk of false lock-on of the method comprises a second step of calculation of the mean theoretical self-correlation function over an integration period.

The first function can comprise a second subfunction 53 adapted to implement the second step of calculation of the mean theoretical self-correlation function.

In the mode illustrated in FIG. 1, the second subfunction 53 is implemented in the module 5 for determining the location of the receiver, upstream of the satellite channels CAL and it gives an output that can be used by all the channels. Thus, the second subfunction 53 receives the mean of the impulse responses $RI_{mean}$ from the first subfunction 44.

According to the embodiment presented, the second step comprises a convolution operation between the nominal theoretical self-correlation function $A_0$ and the mean impulse response $RI_{mean}$ of the anti-interference filter, so as to deduce therefrom the mean theoretical self-correlation function A, i.e.:

$$A=A_0 * RI_{mean}\quad\text{[Math32]}$$

in which * is the convolution operation

Figure 6A:
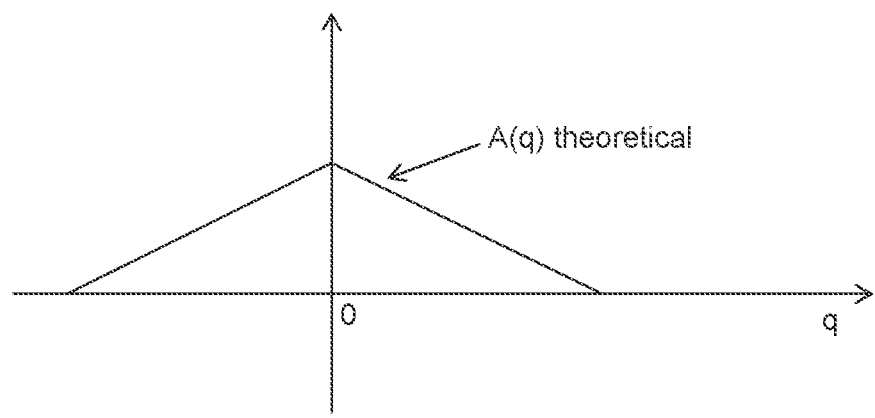
FIG. 6A represents a first example of nominal theoretical self-correlation function.
Figure 6B:
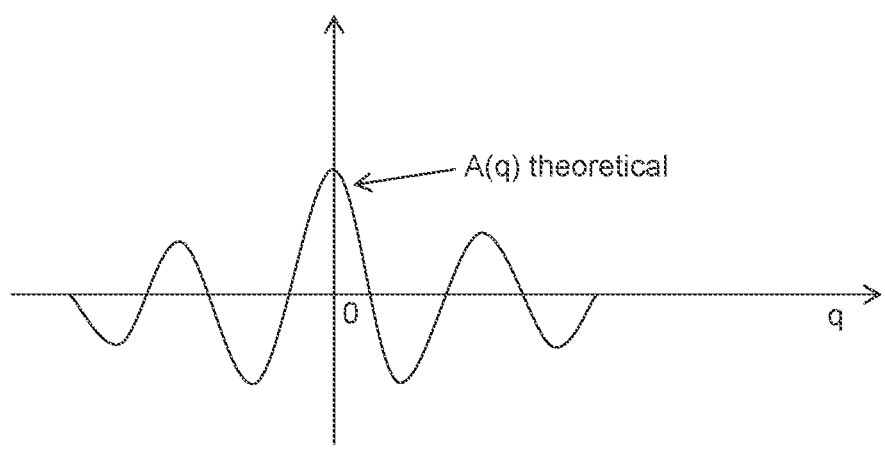
FIG. 6B represents a second example of nominal theoretical self-correlation function.

A nominal theoretical self-correlation function $A_0$ is for example a self-correlation function of a BPSK module (or triangle function) as represented in FIG. 6A or a self-correlation function of a BOC modulation as represented in FIG. 6B.

A mean theoretical self-correlation function A is obtained as a function of time, in which the time is a discrete series of values q, i.e.:
[Math33]

$$A(q)=\sum_{l=0}^{L_a+L-1}A_0(q)\cdot RI_{mean}(l-q)\quad\text{[Math33]}$$

In which L is the number of delays used in the linear filter, and $L_a$ is the length of the support of the nominal theoretical self-correlation function, that is to say without filtering. The support of the self-correlation function designates the interval of its argument τ for which its values can be considered to be non-zero. The argument τ of the self-correlation function corresponds to the difference between the phase of the code received and the phase of the local code. The discrete values q correspond to discrete values lying between 0 and $L_a+L-1$.

The support $L_a$ of the nominal correlation function can be an interval lying between −1.5 and +1.5 Chip ($T_c$) or between −1 and +1 Chip. More generally, the value of $L_a$ will be determined as a function of the precision desired for the method according to the invention.

The nominal theoretical correlation function $A_0$ is in the form of a vector of length $L_a$:

$$A_0=[A_0(0)A_0(1)\ldots A_0(l)\ldots A_0(L_a-1)]\text{[Math34]}$$

The mean impulse response of the filter is in the form of a vector of length L:

$$[RI_{mean}=[RI_{mean}(0)RI_{mean}(1)\ \ldots\ RI_{mean}(l)\ \ldots\ RI_{mean}(L-1)]$$

The nominal theoretical correlation function A obtained by the formula Math33 is in the form of a vector of length $L+L_a-1$:

$$A=[A(0)A(1)\ldots A(l)\ldots A(L_a+L-1)]\quad\text{[Math36]}$$

The first phase comprises a third step of determination of a number of peaks (or local maxima) of the mean theoretical self-correlation function A over the length $L+L_a-1$.

The presence of multiple peaks of the mean theoretical self-correlation function A for which the maxima exhibit an attenuation value relative to the maximum of the main peak (i.e. a secondary peak to main peak ratio) compatible with the lock threshold (i.e. the minimum value of a peak for it to be visible to a lock loop), in fact informs as to the risk of false lock-on.

In the embodiment illustrated in FIG. 1, this third step is also performed in the second subfunction 53.

To determine the number of peaks, one solution is to search for the zeroes of the derivative of the modulus squared of the mean theoretical self-correlation function A, that is to say search for the zero or zeroes of the following derivative function:

$$(\|A(t+dt)\|^2 - \|A(t-dt)\|^2)/dt = \mathrm{Re}[(A(t+dt) - A(t-dt)) \cdot (A(t+dt) + A(t-dt))^*]/dt \qquad [\text{Math37}]$$

In which Re represents the real part and * the conjugate of the function.

Since the variable t is an integer number (q), dt cannot be smaller than 1 and the derivative function is equivalent to the following function Delta(q) for which the zeroes will be sought:

$$\mathrm{Delta}(q) = \mathrm{Re}[(A(q+1) - A(q-1)) \cdot (A(q+1) + A(q-1))^*] \qquad [\text{Math 38}]$$

This can be likened to the following function Delta(q):

$$\mathrm{Delta}(q) = \mathrm{Re}[(A(q+1) - A(q-1)) \cdot A(q-1) + A(q-1))^*] \qquad [\text{Math39}]$$

The peaks sought corresponding to a zero "derivative" and a negative "second derivative" are obtained by searching for the zero values of the Delta function around which the slopes are negative.

If at least two peaks are found, i.e. a main peak and at least one secondary peak of the mean theoretical self-correlation function A, then there is a risk of false lock-on. Preferably, an alarm is triggered because there is a risk that, for one reason or another, one of the satellite processing channels is locking onto a secondary peak.

Preferably, only that zero or those zeroes with negative slope of the Delta function are retained for which the value of the modulus squared of the self-correlation function A is above a first threshold S1 likely to allow a stable lock-on of the code and carrier loops of the satellite channel.

Preferably, the first minimal threshold S1 depends on the logarithmic scale deviation x between the maximum signal-to-noise ratio C/N0 that can be received from the satellites and the lock threshold expressed in dBHz, linked to the sensitivity threshold of the receiver. Thus, the first threshold S1 can be expressed in the form:
[Math40]

$$S1 = \frac{\max(\|\max(A_0)\|^2)}{10^{\frac{x}{10}}} \qquad [\text{Math40}]$$

For example, for a signal-to-noise ratio of 50 dB and a lock threshold at 30 dB, the deviation x is 20 dB. The denominator of the function Math40 is equal to 100. Thus, for the secondary peak to be taken into account, it is necessary for the modulus squared of the value of the function A at this peak to be at least equal to a hundredth of the modulus squared of the nominal self-correlation function $A_0$.

The first threshold S1 can be modulated by considering, not the theoretical maximum C/N0, but the maximum C/N0 measured on the satellites that are assumed well locked on.

If at least two peaks are found, i.e. one main peak and at least one secondary peak, for the mean theoretical self-correlation function A above this first threshold S1, then there is a risk of false lock-on. Preferably, an alarm is triggered because there is a risk that, for one reason or another, one of the satellite processing channels is locked onto a secondary peak.

According to one embodiment, the method according to the invention comprises a second phase of detection of a false lock-on.

If, in the first phase, a risk of false lock-on has been detected, then it is possible to verify whether a satellite channel is effectively badly locked on, i.e. whether it is really locked onto a secondary peak. This second phase is performed preferably for each processing channel for which a risk of false lock-on has been detected in the first phase.

The receiver can thus comprise a second function $54_s$ capable of implementing the second phase of detection of a false lock-on. A second function is implemented at the level of a satellite channel or at the output of a satellite channel. There are as many second functions $54_s$ as there are satellite channels (s varies between 1 and S).

To recap, to close the lock loops, a local code generator generates at the very least a punctual local code, a late local code and an early local code, even only a punctual code and a late or early code. These different codes are multiplied with the carrier-demodulated signal on different pathways (punctual pathway, late pathway and/or early pathway) using a plurality of correlation multipliers disposed in parallel. The signals at the output of the correlation multipliers can then be integrated by a correlation integrator, producing samples of digitized signals forming the correlation pathways.

The second phase comprises a first step of calculation of probability between the mean theoretical self-correlation function and the self-correlation function measured in the correlation pathways.

Said first step requires the use of several correlation pathways, at the very least the early, punctual and/or late pathways that generally already exist because they are useful for locking the phase of the code, to which can be added additional correlation pathways. The principle is to calculate the probability between the mean theoretical self-correlation function and the self-correlation function measured in the correlation pathways.

Since the correlation pathways each comprise a correlator, they will be able to be referred to hereinbelow as "correlators" for brevity.

It should be noted that additional correlation pathways may already be available in certain types of receivers using multiple correlators for the purposes of speeding up the acquisition phases. It is therefore advantageous to exploit such already existing correlation pathways.

To calculate the probability between the mean theoretical self-correlation function and the self-correlation function measured in the correlation pathways, it is possible to determine the values of the theoretical and measured self-correlation functions at the different positions $q_i$ of the correlators. A position corresponds to a shift of the local code of the correlator relative to the punctual code. That can be a temporal unit, such as the sampling period Te, or a chip. It is then possible to calculate a nominal probability criterion Criterion0 by normalized scalar product compared to 1 according to the formula:
[Math41]

$$\mathrm{Criterion0} = \frac{\left(\sum_{i=1}^{NC} A(q_i) \cdot A_{mes}(q_i)\right)^2}{\left(\sum_{i=0}^{NC} \|A(q_i)\|^2\right)\left(\sum_{i=0}^{NC} \|A_{mes}(q_i)\|^2\right)} \qquad [\text{Math41}]$$

In which $A_{mes}(q_i)$ is the output of the correlator n° i averaged over the integration period $T_{mean}$, $q_i$ is the position of the correlator n° i (for example: $q_A$, $q_P$, $q_R$ which are the positions of the early, punctual and late correlators) and NC is the number of correlators used in the calculation.

The number NC of correlators comprises at least the early, punctual and/or late correlators necessary to the locking of the loops.

The values $q_i$ corresponding to the positions of the correlators are not necessarily integers, or are not necessarily implemented one at a time, or even are not necessarily evenly spaced apart, contrary to the positions q that are used for the calculation of the mean theoretical self-correlation function A. Thus, they do not necessarily coincide with the integer positions q used for the calculation of A by the formula Math33. If the values $q_i$ are not integers or are not implemented one at a time or evenly, it is for example possible to use a polynomial interpolation.

The second phase comprises a second step of comparison of the result of the probability calculation with a second threshold S2.

For example, the nominal probability criterion Criterion0 can be compared with a second threshold S2. If it is greater than or equal to the second threshold S2, then it is estimated that the mean theoretical self-correlation function A is well centered on the punctual pathway and that the satellite channel is well locked on.

If the nominal probability criterion is below the second threshold S2, then it is estimated that the satellite channel is badly locked on. Preferably, an alarm is triggered. Preferably, a third phase of searching for a main peak is triggered, either by relaunching the channel to search for the correlation peak (which induces a loss of measurement time corresponding to the time to find the peak and close the locks, without counting the time for a new detection of risk of false lock-on), or by directly searching for the main lock-on peak by translation on the correlation pathways (less measurement time lost) as described further below.

The value of the second threshold S2 is preferably determined so as to find the best trade-off between the probability of false alarm (if its value is too great) and the probability of non-detection (if its value is too small). A false alarm can lead to a discontinuity of service if the position of the main peak cannot be detected. A non-detection can lead to an unflagged erroneous measurement, therefore a non-integrity.

The second threshold S2 can lie between 0.7 and 0.9, for example be equal to 0.8.

To avoid the false alarms due to the noise on the measurements $A_{mes}(q_i)$, it is advantageous to use a calculation time for the average of the integration period $T_{mean}$ that is long enough.

According to one embodiment, the method according to the invention comprises a third phase of searching for the main peak.

The receiver can thus comprise a third function $55_s$ capable of implementing the third phase of searching for the main peak. A third function is implemented at the level of a satellite channel. There are as many third functions $55_s$ as there are satellite channels (s varies between 1 and S).

According to a particular embodiment, the third phase of searching for the main peak replies on a translation of the mean theoretical correlation function A until it corresponds to the measured self-correlation function $A_{mes}$ or at least until it approaches the latter according to a given probability threshold. Said third phase requires the use of several correlation pathways, at least the early, punctual and/or late pathways, to which can be added additional correlation pathways, as explained for the second phase.

Several false lock-on hypotheses are tested, each hypothesis corresponding to a peak, i.e. to a zero of the Delta function (obtained for a value $d_j$), and the probability is calculated between the theoretical self-correlation function $A(q_i+d_j)$ translated by this value relative to the measured self-correlation function $A_{mes}(q_i)$ at the positions $q_i$ of the correlators.

Several false lock-on hypotheses can be tested at the same time.

To calculate the probability between the translated mean theoretical self-correlation function and the measured self-correlation function, it is possible to determine the values of the theoretical self-correlation function for the positions shifted by relative to the different temporal positions $q_i$ of the correlators and the values of the self-correlation function measured for positions equal to the different temporal positions $q_i$ of the correlators. It is then possible to calculate a j-th probability criterion Criterion j by normalized scalar product compared to 1 according to the formula:

[Math42]

$$\text{Criterion } j = \frac{\left(\sum_{i=1}^{NC} A(q_i + d_i) \cdot A_{mes}(q_i)\right)^2}{\left(\sum_{i=0}^{NC} \|A(q_i + d_i)\|^2\right)\left(\sum_{i=0}^{NC} \|A_{mes}(q_i)\|^2\right)}$$

In which $d_j$ corresponds to a zero of the Delta function, or to a zero of the Delta function such that the value of the modulus squared of the mean theoretical correlation function A is greater than or equal to the first threshold S1 as explained in the description of the first phase of the method according to the invention.

The value of $d_j$ that gives the greatest criterion value is retained. If the greatest criterion value exceeds a third threshold S3, for example equal to 0.9, a local code jump of $d_j$. Te is performed (to recap, Te is the sampling period) in the satellite channel and, after convergence of the loops, the new calculated criterion value is checked to see that it is still greater than a fourth threshold S4, for example equal to 0.95.

The value of the third threshold S3 is chosen to be fairly close to 1 to avoid detecting a local false maximum, with a small margin to take account of the noises at the output of the correlators and avoid rejecting the good local maximum.

The value of the fourth threshold S4 is chosen to be greater than the value of the third threshold S3 in order to confirm the lock onto the good peak, bearing in mind that, after the local code jump, an enhanced probability criterion should be found.

If the greater criterion value is below the third threshold of S3 or S4, then the alarm is maintained and the channel is relaunched in search for a correlation peak.

Figure 7A:
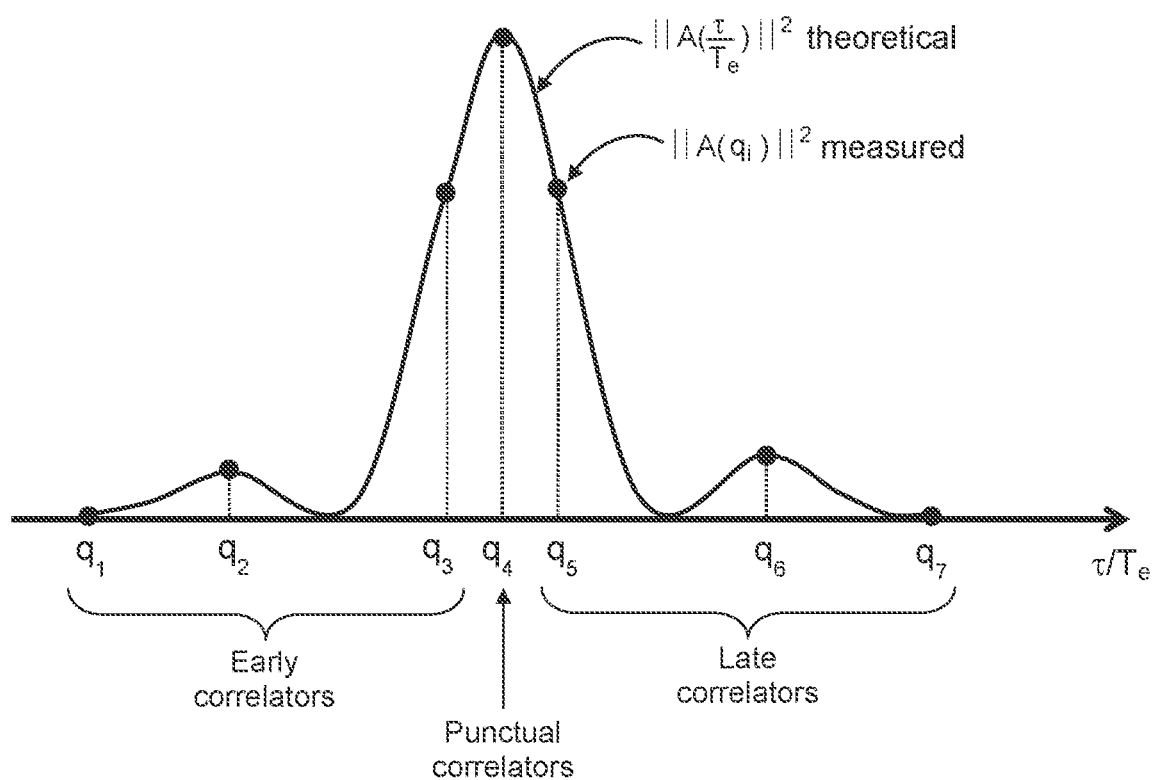

FIG. 7A represents two theoretical and measured self-correlation functions which coincide, illustrating a good lock-on: the correlation peak measured at the level of the punctual correlator is indeed the main peak of the theoretical self-correlation function.

Figure 7B:
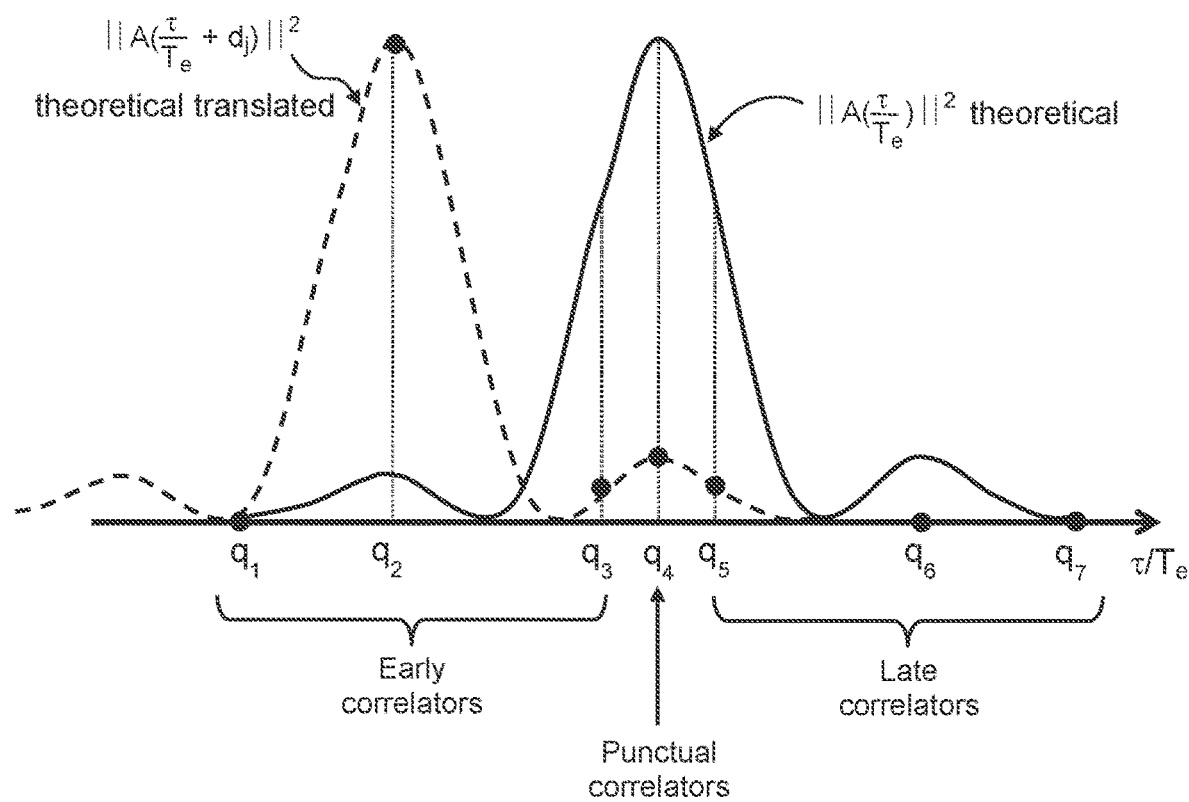

FIG. 7B illustrates two theoretical (solid line) and shifted theoretical (dotted line) self-correlation functions, the shift illustrating a false lock-on of the satellite channel: the correlation peak measured at the level of the punctual correlator is not the main peak of the self-correlation function. The local code of the punctual correlator is early by a value of $d_j$ equal to $q_4$ minus $q_2$ relative to the received code. To find the good peak, it is necessary to perform a local code jump of $-d_j$. Te, i.e. of $$-d_j \cdot \text{Te} = -(q_4 - q_2) \cdot \text{Te} \qquad \text{[Math44]}$$

Unless stated otherwise, the different embodiments can be combined with one another.

Furthermore, it should be understood that other embodiments can be used and notably that logical modifications can be made. Furthermore, the embodiments presented in the detailed description of the invention cannot be interpreted as limiting the order of the steps and substeps.

The invention applies to any type of receiver of satellite or pseudolite radionavigation signals.

The receiver incorporating an integrity checking function according to the invention can comprise software or hardware means or a combination of software and hardware means. The first, second and third functions, the first and second subfunctions (more generally the functions and subfunctions) can be implemented in the form of lines of code (in the software sense of the term) within means that already exist in the receiver.

For example, the receiver or each of the elements of which it is composed, can be implemented by means of a processor which can be a generic processor, a specific processor, an application-specific integrated circuit (also known by its acronym ASIC) or a field-programmable gate array (also known by its acronym FPGA).

The method according to the invention can be implemented on a reprogrammable computation machine (a processor or microcontroller for example), whether it already exists or not, running a program comprising a sequence of instructions, or on a dedicated computation machine (for example a set of logic gates such as an FPGA or an ASIC, or any other hardware module).

The fields of application of the invention can be, among others, those of aeronautical navigation, terrestrial navigation, space navigation, maritime and submarine navigation.

The invention claimed is:

1. A method for checking an integrity of processing of a radionavigation signal emitted by a satellite ($SAT_i$) of a satellite positioning system, said radionavigation signal being received by a receiver comprising reception means and processing means, said processing means comprising a linear anti-interference filter, said integrity checking method comprises at least a first phase of detection of a risk of false lock-on comprising the following steps:
   receiving the radionavigation signal at the reception means, the radionavigation signal having a nominal theoretical self-correlation function ($A_0$);
   processing the radionavigation signal in an anti-interference processing module by the linear anti-interference filter implemented by the anti-interference processing module over a defined integration period ($T_{mean}$) to determine a mean impulse response;
   determining with a location determination module a mean theoretical self-correlation function (A) of said radionavigation signal received based on the mean impulse response and the nominal theoretical self-correlation function ($A_0$);
   determining with the location determination module a number of local maxima of the mean theoretical self-correlation function (A) that comprises a modulus of the mean theoretical self-correlation function (A) or a modulus squared of the mean theoretical self-correlation function (A); and
   determining with the location determination module a risk of false lock-on when said number of local maxima is greater than or equal to two and triggering an alarm.

2. The method according to claim 1, comprising a step of determination of a mean impulse response ($RI_{mean}$) of the linear anti-interference filter over the integration period ($T_{mean}$), prior to the step of determination of the mean theoretical self-correlation function (A), and in that said mean theoretical self-correlation function (A) is determined from the nominal theoretical self-correlation function ($A_0$) and from said mean impulse response ($RI_{mean}$) of the linear anti-interference filter.

3. The method according to claim 2, wherein the mean impulse response ($RI_{mean}$) of the linear anti-interference filter is determined from different values of coefficients of the anti-interference filter calculated over said integration period.

4. The method according to claim 1, further comprising:
   a step of definition of a first threshold (S1), said first threshold being based on a deviation between a maximum signal-to-noise ratio of the signal being received by the receiver and a lock threshold, wherein the lock threshold corresponds to a value of a peak for it to be visible to a lock loop; and
   in that the number of local maxima determined corresponds to the number of local maxima for which the value of the modulus or of the modulus squared of a final mean self-correlation function is greater than or equal to said first threshold (S1).

5. The method according to claim 4, wherein said first threshold (S1) is defined by the following formula:

$$S1 = \frac{\text{Max}(\|\text{max}(A_0)\|^2)}{10^{\frac{x}{10}}}$$

wherein x represents the deviation between the maximum signal-to-noise ratio and a lock threshold and $A_0$ represents the nominal theoretical self-correlation function.

6. The method according to claim 1, further comprising a step of triggering of an alarm if the number of local maxima determined is greater than or equal to two.

7. The method according to claim 1, wherein the processing means comprise a processing channel for each satellite, each channel comprises a code loop capable on one hand of locally generating a spreading code characteristic of the satellite ($SAT_s$) associated with said channel so as to form a local signal and capable on another hand of interlocking said local signal with said received signal by using a correlation pathway between said received signal and said signal local, and in that the integration period ($T_{mean}$) is a function of the period ($T_{loop}$) of said code loop.

8. The method according to claim 1, wherein the processing means comprise a processing channel for each satellite, each channel comprises a code loop capable of locally generating spreading codes characteristic of the satellite ($SAT_s$) associated with said channel, said codes comprising at least one punctual code, one late code and/or one early code each forming a local signal, each punctual, late and/or early local signal being correlated with the received signal by using, respectively, a punctual correlation pathway, a late correlation pathway and/or an early correlation pathway, and in that said method further comprises a second phase of detection of a false lock-on, said second phase comprising:
   a step of calculation of a probability between the mean theoretical self-correlation function (A) and a measured output averaged over the integration period ($T_{mean}$) for each of a set of the punctual, late and/or early correlation pathways; and
   a step of comparison of the calculated probability with a second threshold (S2), a false lock-on being detected by the calculated probability being lower than said second threshold.

9. The method according to claim 8, wherein a result of the step of probability calculation uses a nominal probability criterion (Criterion 0) defined according to the following formula:

$$\text{Criterion0} = \frac{\left(\sum_{i=1}^{NC} A(q_i) \cdot A_{mes}(q_i)\right)^2}{\left(\sum_{i=0}^{NC} \|A(q_i)\|^2\right)\left(\sum_{i=0}^{NC} \|A_{mes}(q_i)\|^2\right)}$$

wherein $q_i$ is a position of a correlation pathway n° i and NC is a number of correlation pathways.

10. The method according to claim 8, further comprising a third phase of searching for a main local maximum of the local maxima, said third phase performing a search for the main local maximum if a result of the probability calculation is lower than the second threshold (S2), said third phase comprising the following steps:
    a j-th step of calculation of probability between the mean theoretical self-correlation function (A) translated by a j-th translation value ($d_j$) relative to the position ($q_i$) of the correlation pathways, and a measured self-correlation function ($A_{mes}$) for each of the set of the correlation pathways, the j-th translation value ($d_j$) corresponding to a j-th local maximum; and
    a step of comparison of the result of a j-th probability calculation with a third threshold (S3), a result of the j-th probability calculation above said third threshold making it possible to determine whether the j-th translation value ($d_j$) corresponds to the main local maximum.

11. The method according to claim 10, wherein the result of the j-th step of probability calculation uses a j-th probability criterion (Criterion j) defined according to the following formula:

$$\text{Criterion } j = \frac{\left(\sum_{i=1}^{NC} A(q_i + d_i) \cdot A_{mes}(q_i)\right)^2}{\left(\sum_{i=0}^{NC} \|A(q_i + d_i)\|^2\right)\left(\sum_{i=0}^{NC} \|A_{mes}(q_i)\|^2\right)}$$

wherein $d_j$ is the j-th translation value, $q_i$ is position of an i-th correlation pathway and NC is a number of correlation pathways.

12. A receiver of a satellite positioning system, the receiver comprising:
    reception means capable of picking up a signal emitted by a plurality of satellites and processing means coupled to said reception means and capable of processing a received signal, said processing means comprising anti-interference filter,
    said receiver being configured to implement a first phase of a detection of a risk of false lock-on that comprises:
    determination with an anti-interference processing module by a linear anti-interference filter by the anti-interference processing module over a defined integration period ($T_{mean}$) to determine a mean impulse response;
    determination with a location determination module of a mean theoretical self-correlation function (A) of said signal received and processed by the linear anti-interference filter based on the mean impulse response and the nominal theoretical self-correlation function ($A_0$);
    determination with the location determination module of a number of local maxima of the mean theoretical self-correlation function (A) that comprises a modulus of the mean theoretical self-correlation function (A) or a modulus squared of the mean theoretical self-correlation function (A), wherein a risk of false lock-on being detected if said number of local maxima is greater than or equal to two; and
    determination with the location determination module a risk of false lock-on when said number of local maxima is greater than or equal to two to trigger an alarm.

13. The receiver according to claim 12, wherein said receiver is further configured to detect a false lock-on by:
    calculating a probability between the mean theoretical self-correlation function (A) and a measured self-correlation function ($A_{mes}$) for each of a set of punctual, late and/or early correlation pathways; and
    comparing the calculated probability with a second threshold (S2), a false lock-on being detected by the calculated probability being lower than said second threshold.

14. The receiver according to claim 13, wherein said receiver is further configured to search for a main local maximum, the search comprising:
    a step of performance of a search for the main local maximum when the calculated probability is lower than the second threshold (S2);
    a j-th step of calculation of a probability between the mean theoretical self-correlation function (A) translated by a j-th translation value ($d_j$) relative to a position ($q_i$) of the correlation pathways, and the measured self-correlation function ($A_{mes}$) for each of the set of the correlation pathways, the j-th translation value ($d_j$) corresponding to a j-th local maximum; and
    a step of comparison of a j-th calculated probability with a third threshold (S3), the j-th calculated probability being above said third threshold making it possible to determine whether the j-th translation value ($d_j$) corresponds to the main local maximum.

* * * * *

UNITED STATES PATENT AND TRADEMARK OFFICE
CERTIFICATE OF CORRECTION

PATENT NO. : 11,693,121 B2
APPLICATION NO. : 16/814870
DATED : July 4, 2023
INVENTOR(S) : Nicolas Martin et al.

Page 1 of 1

It is certified that error appears in the above-identified patent and that said Letters Patent is hereby corrected as shown below:

In the Claims

In Claim 11, Column 25, Line 42:

" $$\text{Criterion } j = \frac{\left(\sum_{i=1}^{NC} A(q_i + d_i) \cdot A_{mes}(q_i)\right)^2}{\left(\sum_{i=0}^{NC} \|A(q_i + d_i)\|^2\right)\left(\sum_{i=0}^{NC} \|A_{mes}(q_i)\|^2\right)},$$ "

Should be:

$$\text{Criterion } j = \frac{\left(\sum_{i=1}^{NC} A(q_i + d_j) \cdot A_{calc}(q_i)\right)^2}{\left(\sum_{i=0}^{NC} \|A(q_i + d_j)\|^2\right)\left(\sum_{i=0}^{NC} \|A_{calc}(q_i)\|^2\right)}$$

-- --.

Signed and Sealed this
Third Day of October, 2023

Katherine Kelly Vidal
Director of the United States Patent and Trademark Office